(12) United States Patent
Seguchi

(10) Patent No.: US 7,347,598 B2
(45) Date of Patent: Mar. 25, 2008

(54) OUTSIDE MIRROR APPARATUS FOR VEHICLE AND ILLUMINATING UNIT FOR OUTSIDE MIRROR APPARATUS

(75) Inventor: Hideki Seguchi, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 157 days.

(21) Appl. No.: 11/041,874

(22) Filed: Jan. 25, 2005

(65) Prior Publication Data

US 2005/0174789 A1 Aug. 11, 2005

(30) Foreign Application Priority Data

Feb. 2, 2004 (JP) ............... 2004-026000

(51) Int. Cl.
*B60Q 1/56* (2006.01)
(52) U.S. Cl. ..................... 362/494; 362/509
(58) Field of Classification Search ........ 362/517, 362/543, 545, 494, 555, 509; 40/541
See application file for complete search history.

(56) References Cited

U.S. PATENT DOCUMENTS

| | | | | |
|---|---|---|---|---|
| 4,139,955 A | * | 2/1979 | Reiback | 40/427 |
| 6,332,701 B1 | * | 12/2001 | Yamada et al. | 362/517 |
| 6,485,170 B2 | * | 11/2002 | Natsume | 362/509 |
| 6,619,825 B2 | * | 9/2003 | Natsume | 362/509 |
| 6,637,917 B2 | * | 10/2003 | Schwanz et al. | 362/487 |
| 6,968,640 B2 | * | 11/2005 | Lee | 40/541 |
| 7,080,913 B2 | * | 7/2006 | Henion et al. | 359/864 |
| 2005/0078486 A1 | * | 4/2005 | Kawaguchi | 362/494 |

FOREIGN PATENT DOCUMENTS

| | | |
|---|---|---|
| JP | 9-175273 A | 7/1997 |
| JP | 9-254713 A | 9/1997 |
| JP | 2000-111712 A | 4/2000 |
| JP | 2000-225890 A | 8/2000 |
| JP | 2001-163117 A | 6/2001 |
| JP | 2002-079878 A | 3/2002 |

\* cited by examiner

*Primary Examiner*—Anabel M Ton
(74) *Attorney, Agent, or Firm*—Foley & Lardner LLP

(57) ABSTRACT

An outside mirror apparatus for a vehicle includes an illuminating unit that includes a lens and a base that divide a lamp chamber, and a light source that is disposed in the lamp chamber. A half-mirror is formed on the lens.

17 Claims, 3 Drawing Sheets

OUTSIDE MIRROR APPARATUS FOR VEHICLE AND ILLUMINATING UNIT FOR OUTSIDE MIRROR APPARATUS

CROSS-REFERENCE TO RELATED APPLICATIONS

The present document incorporates by reference the entire contents of Japanese priority document, 2004-026000 filed in Japan on Feb. 2, 2004.

BACKGROUND OF THE INVENTION

1) Field of the Invention

The present invention relates to an outside mirror apparatus for a vehicle, and an illuminating unit for the outside mirror apparatus.

2) Description of the Related Art

An outside mirror apparatus for a vehicle and an illuminating unit for the outside mirror apparatus have been disclosed in Japanese Patent Application Laid-open Publication No. 2002-79878.

The illuminating unit described in the above literature is installed in a door mirror and includes a light source and an outer lens for widening the light from the light source. However, according to the outside door mirror for the vehicle and the illuminating unit disclosed in Japanese Patent Application Laid-open Publication No. 2002-79878, the outer lens being made of a transparent resin material, the light source looks to be transparent from outside. Therefore, an appearance of the illuminating unit when the light source is turned off is not good.

SUMMARY OF THE INVENTION

It is an object of the present invention to solve at least the above problems in the conventional technology.

An outside mirror apparatus for a vehicle according to one aspect of the present invention includes an illuminating unit that includes a lens and a base that divide a lamp chamber; and a light source that is disposed in the lamp chamber. A half-mirror is formed on the lens.

An illuminating unit according to another aspect of the present invention, which is installed in an outside mirror apparatus for a vehicle, includes a lens and a base that divide a lamp chamber; and a light source that is arranged inside the lamp chamber. A half-mirror is formed on the lens.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 4 is a III-III cross section of the outside mirror apparatus shown in FIG. 2 when the light source is turned on.

DETAILED DESCRIPTION

Embodiments of an outside mirror apparatus and a lighting source for the outside mirror apparatus according to the present invention are described below in detail with reference to the accompanying drawings. However, the present invention is not restricted to these embodiments only. Moreover, all modifications, alternative constructions, and substantially identical structures that may occur to one skilled in the art are included in components of the embodiment.

Figure 1:
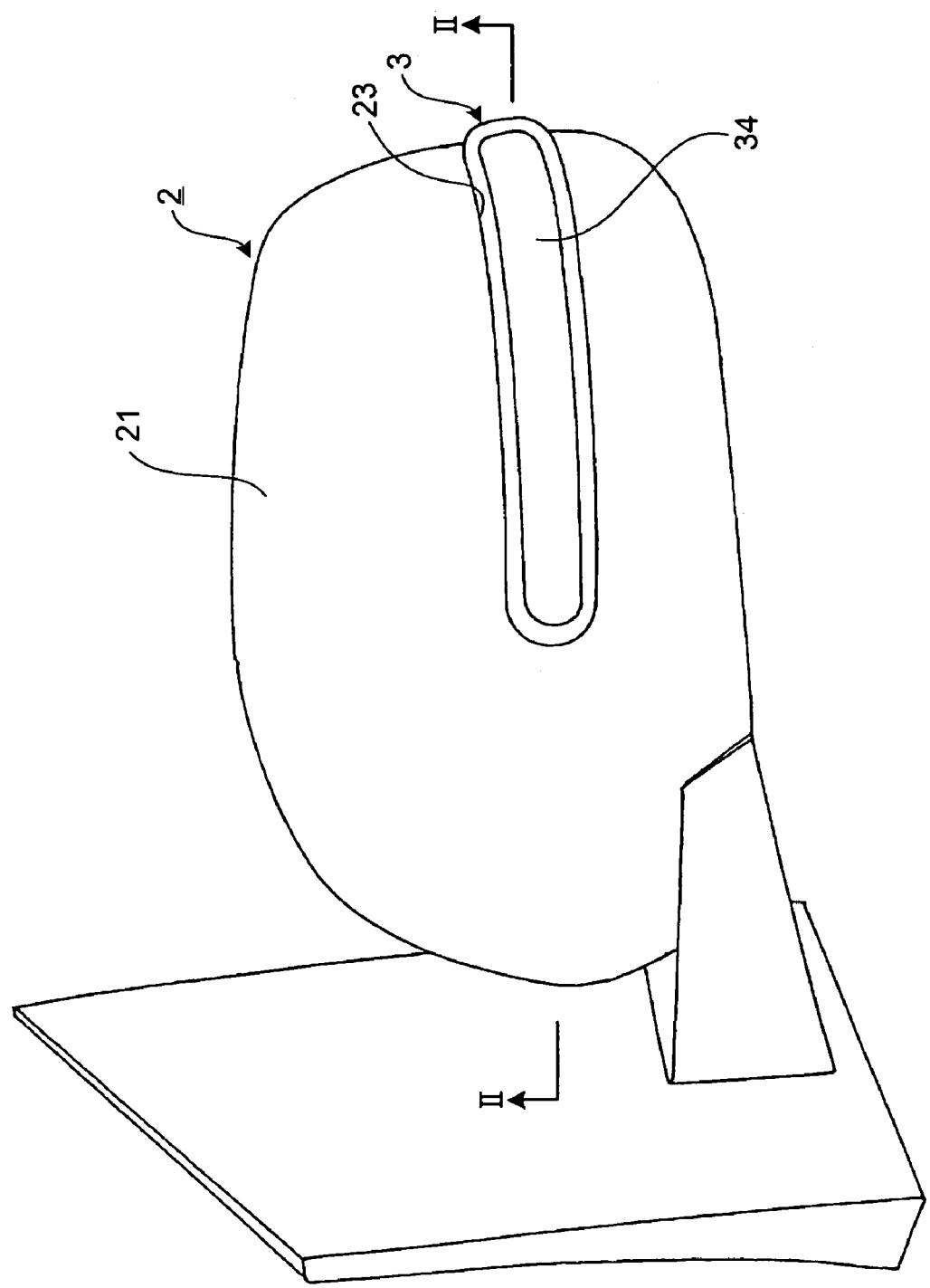
FIG. 1 is a perspective view of an outside mirror apparatus and an illuminating unit for the outside mirror apparatus according to an embodiment of the present invention.
Figure 2:
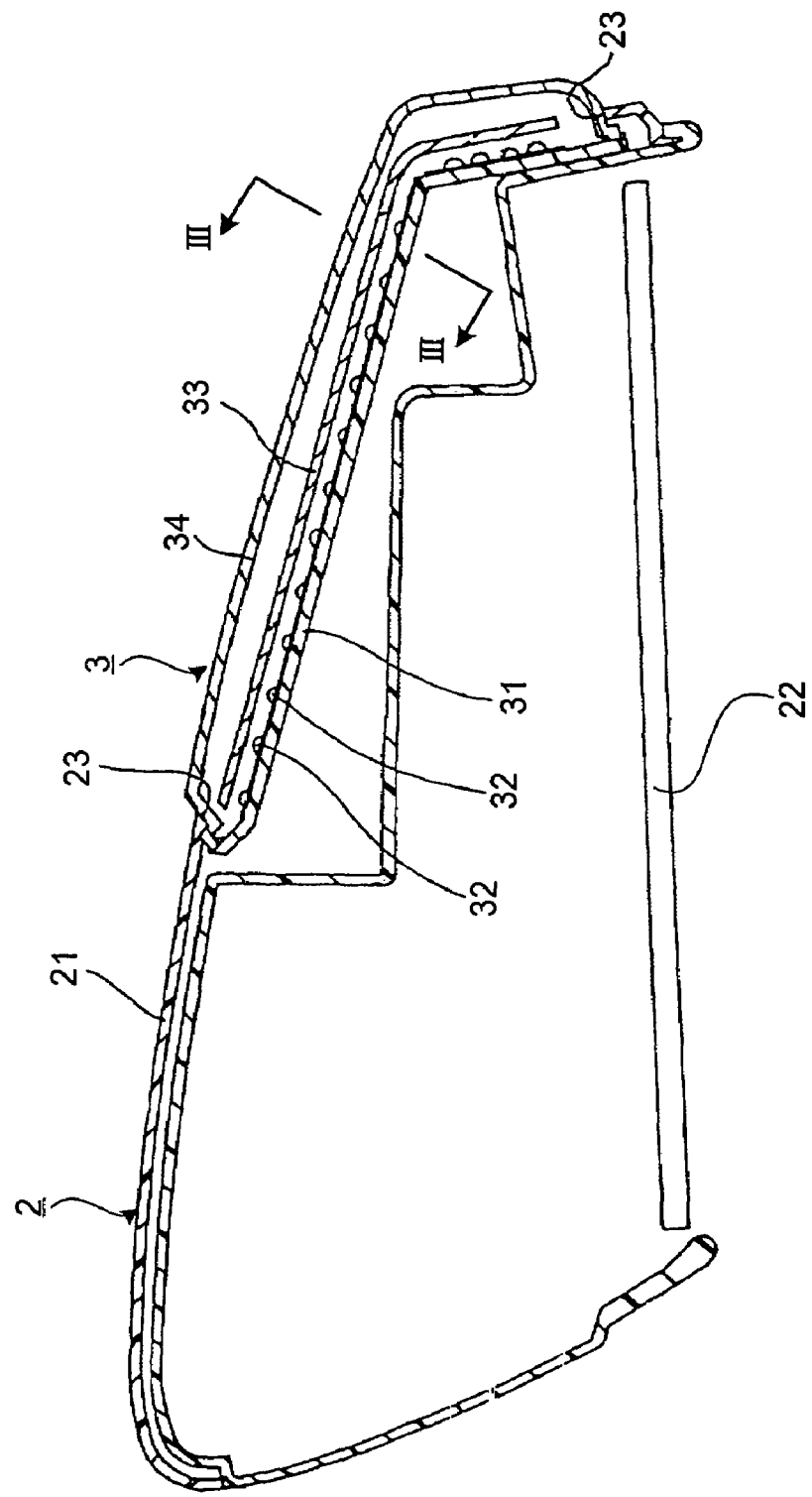
FIG. 2 is a perspective view of the outside mirror apparatus and the illuminating unit for the outside mirror apparatus according to the embodiment of the present invention.

A door mirror 2 is an outside mirror apparatus according to the embodiment. The door mirror 2 is provided with an illuminating unit 3. The door mirror 2 includes a mirror housing 21 and a mirror 22, as shown in FIGS. 1 and 2. The mirror housing 21 has a shape of a curved receptacle and the mirror 22 is disposed at an opening of the mirror housing 21. The mirror housing 21 is installed by fixing on the door of a vehicle such that a side of the opening (a side on which the mirror 22 is disposed) is directed towards a rear side of the vehicle (a side of a driving seat). A long slender notch 23 is cut in the mirror housing 21 such that it runs along a width of the vehicle away from the vehicle from a front side of the vehicle. In FIGS. 1 and 2, the door mirror installed on a left side of the vehicle is shown. A door mirror installed on a right side of the vehicle has a right side and a left side reversed in the door mirror 2 installed on the left side.

The illuminating unit 3 includes a base 31, a light source 32, an inner lens 33, an outer lens 34, and a light diffusing member 35. The illuminating unit 3 is fitted in the notch 23 of the door mirror 2 and is installed such that a front surface of the outer lens 34 is substantially in the same plane as that of an outer peripheral surface (a surface on a front side of the vehicle) of the mirror housing 21. Thus, the illuminating unit 3 is along the width of the vehicle away from the vehicle from a front side of the door mirror 2 and is installed such that it forms a part of the door mirror 2 as seen from outside. The illuminating unit 3, in this case, is a side-turning lamp for the door mirror 2. However, according to the present invention, the illuminating unit 3 may also be used as a lamp other than the side-turning lamp, such as a foot lamp, an illuminating lamp for a camera (including a visible light lamp and an infrared lamp), and a lamp for decoration.

In this illuminating unit 3, the base 31 includes a plate member that is long and slender in shape and has a gentle curved shape along an outer periphery of the door mirror 2. The light source 32 includes a plurality of light emitting elements arranged on a band shaped sheet and is installed by attaching on a flat surface of the base 31. A structure of the light source 32 is not limited to this; and any structure that includes an LED (light emitting diode), a bulb etc. that is evident for the one skilled in the art can be used. The light source includes a flexible sheet of a material such as a glass epoxy resin and a plurality of light emitting elements surface mounted on a surface of the flexible sheet. For surface mounting, a chip material such as an epoxy resin that includes the light emitting elements is fixed by bonding on a front surface of the flexible sheet. The chip is covered by a lens made of a transparent resin and the lens is fixed to the surface of the flexible sheet.

Figure 3:
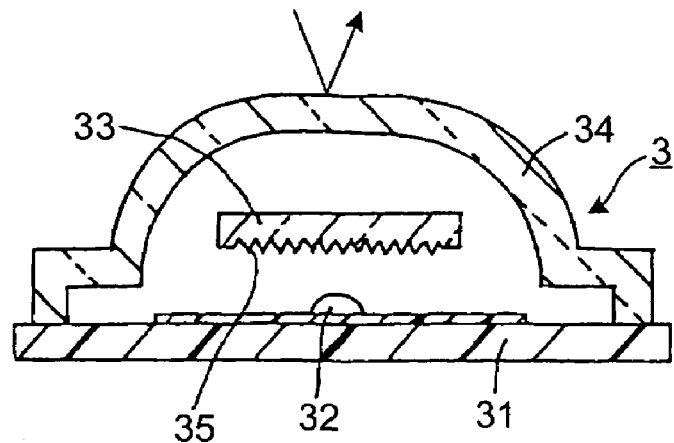
FIG. 3 is a III-III cross section of the outside mirror apparatus shown in FIG. 2 when a light source is turned off.

The inner lens 33 is separated from the base 31 and the light source 32 by a predetermined distance and is installed such that the light source 32 is covered (see FIG. 3). The light diffusing member 35 is formed on an inner surface of the inner lens 33. Concretely, the light diffusing member 35 is formed by providing a prism shape such as a triangular prism shape, a semi-spherical prism shape, and a cylindrical prism shape. The light diffusing member 35 diffuses light while the light from the light source 32 passes through the inner lens 33. The outer lens 34 is installed by fixing to the base 31 such that the light source 32, and the inner lens 33 are covered by the outer lens 34. The outer lens 34 divides the base 31 and a lamp chamber of the illuminating unit 3. The outer lens 34 is disposed to form an outer peripheral surface of the door mirror 2 when the illuminating unit 3 in installed in its position. The outer lens 34 has a function of diffusing and irradiating the light from the light source 32 to outside during the functioning of the illuminating unit. A half-mirror treatment is performed on the outer peripheral surface (a surface that is on the outer peripheral surface in the installed condition) of the outer lens 34 and formed such that the transmissivity of the light from the light source 32 is in a range of 20% to 80%.

The half mirror treatment is carried out by performing processes such as (1) thin-film forming by deposition or sputtering, (2) film-forming by an in-mold treatment, hot stamping process, and sheet sandwiching, (3) silver mirror coating, and (4) printing such as screen printing, tampon printing, and ink-jet printing. The transmissivity can be selected voluntarily within a scope that is evident for the one skilled in the art according to specifications of the illuminating unit or by selection of an option by a user.

In the thin-film forming by deposition or sputtering, an under coat is applied on the outer lens 34 that is a substrate, which includes a synthetic resin material such as PMMA (polymethyl methacrylate) and PC (polycarbonate). An aluminum film is applied on the under coat and a top coat is applied on the aluminum film. This is an indirect deposition. Apart from this, an aluminum film is applied on the outer lens 34 that is a substrate, which includes a synthetic resin material such as PMMA and PC and a top coat is applied on the aluminum film. This is a direct deposition.

The film-forming is possible by the in-mold treatment, hot stamping process, sheet sandwiching as mentioned in item (2). In hot stamping process, an adhesive layer (PMMA) is applied on the outer lens 34 that is a substrate, which includes a synthetic resin material such as PMMA and PC. An aluminum film is applied on the adhesive layer and then a protective layer (PMMA) is applied on the aluminum film.

In the silver mirror coating mentioned in item (3) above, an under coat is applied on the outer lens 34 that is a substrate. A silver layer is applied on the under coat and a top coat is applied on the silver layer. In another silver mirror coating, a silver film is applied on the outer lens 34 that is substrate, which includes PC, and a top coat is applied on the silver film.

According to the embodiment, since the half-mirror treatment is performed on the outer lens 34, when the light source 32 is OFF, the light from the outside is reflected at the outer lens 34 and the illuminating unit 3 looks like a silver surface (see FIG. 3). Therefore, since an internal structure of the illuminating unit 3 is such that it is not possible to look from outside beyond the outer lens 34, an appearance of the illuminating unit 3 and the outside mirror apparatus is improved.

Figure 4:
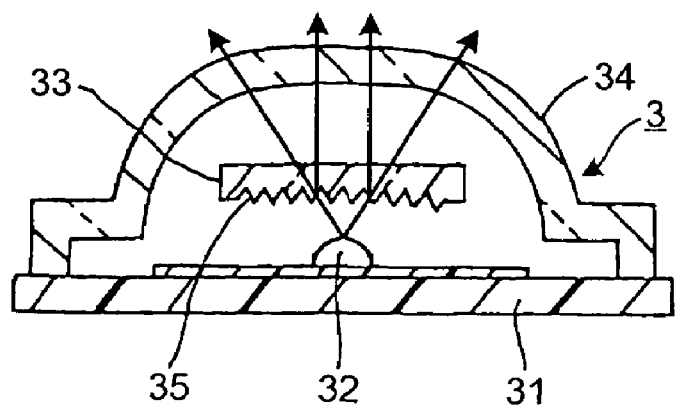

On the other hand, in this structure, the light can pass through the outer lens 34 when the light source 32 is ON and the lighting is visible from the outside (see FIG. 4). Thus, when the light source 32 is OFF, since a part of the illuminating unit and the door mirror 2 that is seen as if not shining, shines, an unexpected visual effect is achieved. When the mirror housing is formed by a dark color, a part on which the half-mirror treatment is performed becomes emphasized. Thus, the appearance of the illuminating unit 3 and the door mirror 2 is further improved.

Moreover, the light from the light source 32 is diffused by the light diffusing member 35 of the inner lens 33 and is irradiated to the outside (see FIG. 4). Therefore, a point of light phenomenon (a phenomenon in which points of lights are seen for each light source 32 that is arranged, when the light source 32 is ON) is controlled, the appearance of the illuminating unit 3 when the light is ON, is improved. Moreover, the appearance of the door mirror 2 as the outside mirror apparatus that is equipped with the illuminating unit 3 is improved.

The half-mirror treatment is performed on the outer lens 34, which is desirable for further improving the appearance of the illuminating unit 3 and the appearance of the door mirror 2 when the light is OFF. However, it is not restricted to this and the half-mirror treatment may be performed on a side of the inner lens 33.

The half-mirror treatment is performed on the outer peripheral surface of the outer lens 34. However, it is not restricted to this and the half-mirror treatment may be performed on the inner peripheral surface of the outer lens 34 (diagram is omitted). Thus, accumulation of dust and dirt on the surface subjected to the half-mirror treatment can be prevented.

The light diffusing member 35 is formed on the inner surface of the inner lens 33 of the illuminating unit 3. This is desirable as the light is diffused at a side close to the light source 32 and points of light of the illuminating unit 3 are suppressed effectively. However, it is not restricted to this and the light diffusing member 35 may be formed on a side of the outer lens 34 (the inner surface or the outer surface, or both of the inner and the outer surfaces). The light diffusing member 35 may be formed on the outer surface (a surface facing the outer lens 34) of the inner lens 33 (diagram is omitted).

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An outside mirror having an illuminating unit, comprising:
   an outside mirror disposed so as to face a rear direction of the vehicle; and
   an illuminating unit disposed so that the illuminating unit faces a forward direction of the vehicle, wherein the illuminating unit comprises:
   a lens and a base that divide a lamp chamber; and
   a light source that is disposed in the lamp chamber,
   wherein the lens comprises an outer lens, and the illuminating unit further comprises an inner lens, and wherein a half-mirror is disposed on at least one of the outer lens and the inner lens, and at least one of the outer lens and the inner lens comprises a light diffusing member that diffuses light from the light source.

2. The outside mirror and illuminating unit apparatus according to claim 1, further comprising a light diffusing member that diffuses light from the light source to irradiate the light outside of the illuminating unit.

3. An illuminating unit that is installed in an outside mirror apparatus for a vehicle, the illuminating unit comprising:
   a lens and a base that divide a lamp chamber; and
   a light source that is arranged inside the lamp chamber, wherein
   a half-mirror is formed on the lens, and wherein the lens includes an outer lens and an inner lens,
the half-mirror is formed on at least one of the outer lens and the inner lens, and
at least other of the outer lens and the inner lens includes a light diffusing member that diffuses light from the light source.

4. The illuminating unit and outside mirror according to claim 3, further comprising a light diffusing member that diffuses light from the light source to irradiate the light outside of the illuminating unit.

5. The illuminating unit and outside mirror according to claim 3, wherein the lens includes a light diffusing member that diffuses light from the light source to irradiate the light outside of the illuminating unit.

6. The illuminating unit and outside mirror according to claim 3,
wherein the half-mirror is formed by at least one of
a thin-film deposition by an evaporating process or a sputtering process;
a film formation by an in-mold treatment, a hot stamping, or a sheet inserting;
a silver mirror coating; and
a printing process including a screen printing, a tampon printing, and an ink-jet printing.

7. The outside mirror and illuminating unit apparatus according to claim 1, wherein the half mirror is configured to permit light to pass through the lens when the illuminating unit is off, wherein the half mirror is configured so that the half mirror reflects light outside of the illuminating unit with the illuminating unit is off.

8. The outside mirror and illuminating unit apparatus according to claim 1,
wherein the outer lens forms an outer surface;
wherein the inner lens is disposed within the lamp chamber.

9. The outside mirror and illuminating unit apparatus according to claim 8, wherein the half mirror is disposed on the inner lens.

10. The outside mirror and illuminating unit apparatus according to claim 8, wherein the half mirror is disposed on the outer lens.

11. The outside mirror and illuminating unit apparatus according to claim 10, wherein the half mirror is disposed on an outer surface of the outer lens.

12. The outside mirror and illuminating unit apparatus according to claim 10, wherein the half mirror is disposed on an inner surface of the outer lens.

13. The outside mirror and illuminating unit apparatus according to claim 8, wherein the inner lens comprises a light diffusing member.

14. The outside mirror and illuminating unit apparatus according to claim 8, wherein the outer lens comprises a light diffusing member.

15. The outside mirror and illuminating unit apparatus according to claim 14, wherein the light diffusing member is disposed on an outer surface of the outer lens.

16. The outside mirror and illuminating unit apparatus according to claim 14, wherein the light diffusing member is disposed on an inner surface of the outer lens.

17. The outside mirror and illuminating unit apparatus according to claim 1, wherein the half mirror comprises a layer of aluminum or silver.

* * * * *